United States Patent [19]
Caso

[11] 3,949,731
[45] Apr. 13, 1976

[54] SPRING TYPE SPEAR FISHING GUNS

[76] Inventor: Adolph Caso, 654 Wellesley St., Weston, Mass. 02193

[22] Filed: Jan. 15, 1975

[21] Appl. No.: 541,336

[52] U.S. Cl. .................. 124/27; 124/41 A; 124/31; 124/30 R; 124/37; 124/26; 124/28; 43/6
[51] Int. Cl.² ............................................ F41B 7/04
[58] Field of Search ......... 124/27, 28, 29, 31, 41 R; 43/6

[56] References Cited
UNITED STATES PATENTS

| | | | |
|---|---|---|---|
| 1,727,812 | 9/1929 | David | 124/26 X |
| 2,404,249 | 7/1946 | Potter | 124/27 X |
| 2,537,754 | 1/1951 | Hanshaw | 124/26 |
| 2,760,480 | 8/1956 | Carroll | 124/31 X |
| 3,004,533 | 10/1961 | Ritz | 124/27 |

*Primary Examiner*—Richard C. Pinkham
*Assistant Examiner*—William R. Browne
*Attorney, Agent, or Firm*—Maurice R. Boiteau

[57] ABSTRACT

There is disclosed in the present application a spear fishing gun assembly adapted to project toward a target either a captive spear or a free spear depending upon the circumstances. The captive spear is projected a distance of up to approximately nine feet from the user and remains coupled to the gun or firing device. The free spear is projected free of the gun although it may for convenience remain connected to the gun by a flexible strand or cord. The propelling force applied to the spears is obtained from a tensioned spring wrapped around the barrel of the assembly.

6 Claims, 5 Drawing Figures

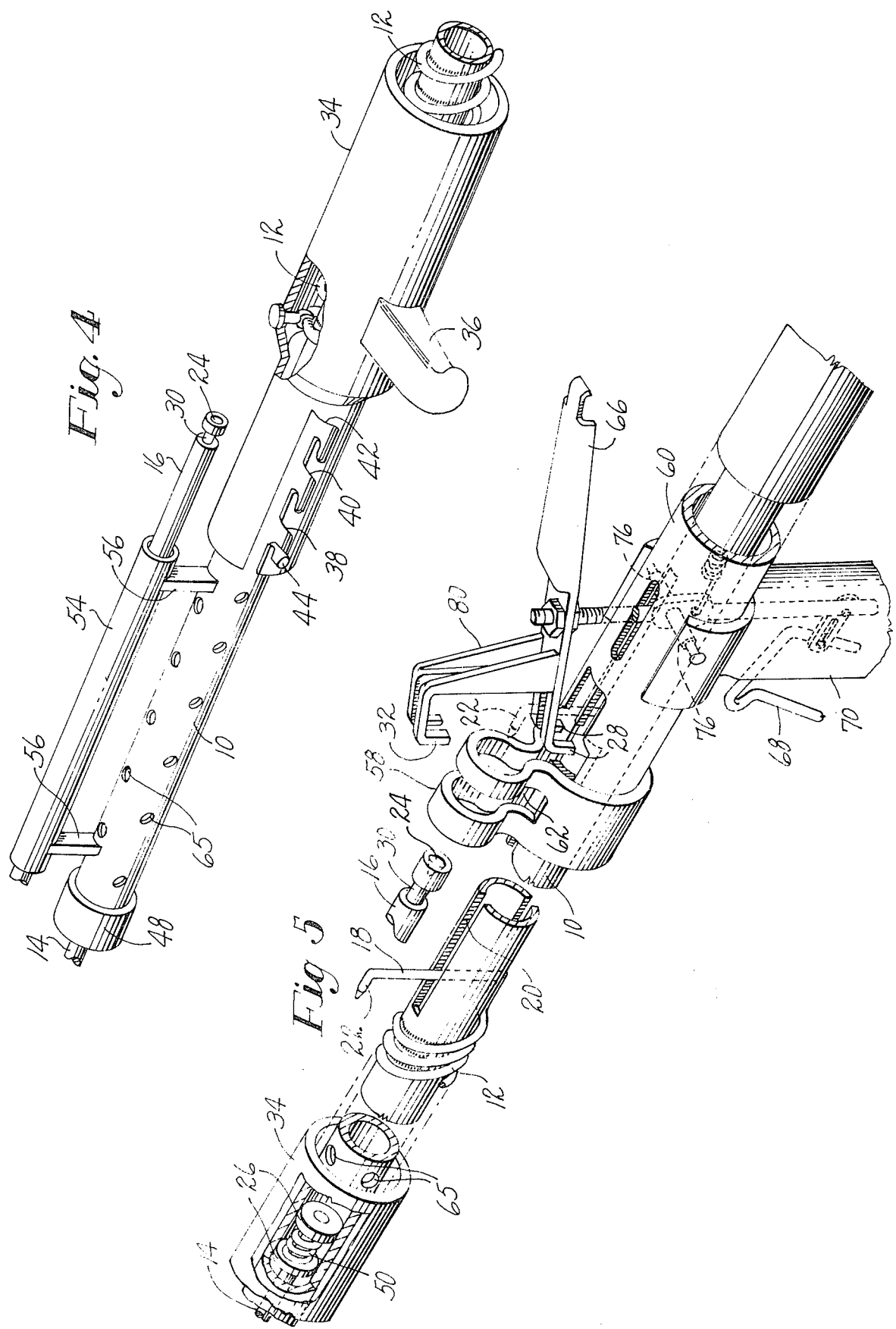

SPRING TYPE SPEAR FISHING GUNS

The present application relates generally to improvements in spear fishing guns and more particularly to such guns which are especially adapted to be used under water with great projectile propelling flexibility depending upon the nature and range of the target.

The sport of underwater fishing with spear guns has grown rapidly in recent years with improvements in and generally greater availability of underwater diving and swimming equipment. However, conventional spear guns are not entirely satisfactory for their intended purpose due to their lack of flexibility. For example, it is very frequently possible in many locations for the swimmer to approach within a few feet of a school of fish without disturbing and scattering them. Under these conditions, optimum performance requires rapid firing of spears at close range. On the other hand, the target may be a greater distance away and not readily approachable, requiring a single or few shots with greater force at a longer range.

It is accordingly a primary object of the invention to provide an underwater spear gun which is equally effective not only against nearby targets but also against more distant targets.

Another object is to improve spear gun effectiveness by improving the speed with which the gun may be readied for firing particularly with a captive spear for targets at close range.

A further object is to improve the utility of an underwater spear gun by permitting it to be held for firing in either of two positions thereby matching the gun positions to the swimming stroke and preference of the user.

The foregoing objects are achieved by a spear gun in which, according to a feature of the invention, the spear is selectively readied for firing in either of two conditions. In one condition associated with a first firing position, the projected spear is captive and is propelled to strike a target relatively near the user. The captive spear remains partly in the gun after being forcefully projected and if the need arises, the gun may be very quickly prepared for one or more subsequent shots. In another condition corresponding to a second firing position, there is alternatively loaded a spear which may be projected completely free of the gun although for convenience the free spear may carry a cord by which it is typically connected to the gun body so that the free spear may be more readily recovered.

According to another feature of the invention, the firing of either spear is accomplished by actuating either of two interconnected triggers which make possible the carrying and aiming of the gun either as a wand or as a pistol depending upon the choice of the user.

The foregoing objects and features, together with numerous advantages of the invention will be more fully appreciated from a detailed description of an illustrative embodiment taken in connection with the accompanying drawings in which:

FIG. 4 is a fragmentary view in perspective of the forward end of the gun of FIG. 3, showing, on an enlarged scale, the relative position of the captive and free spears; and FIG. 5 is a detail view of the trigger portion of the gun with some of the parts shown in exploded relationship for clarity.

Figure 1:
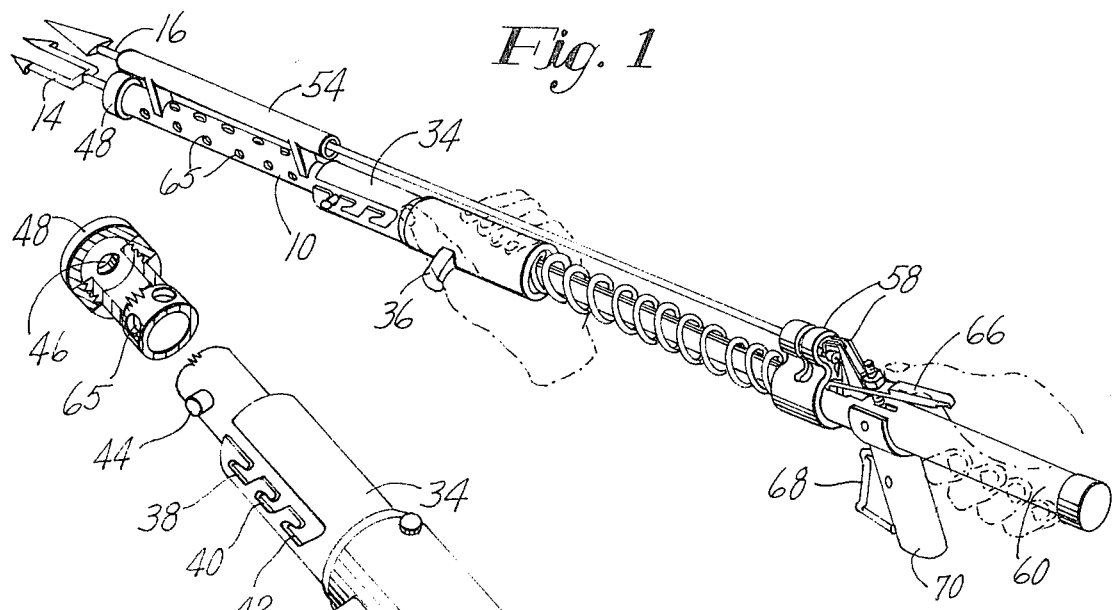
FIG. 1 is a view in perspective of a spear gun according to the present invention showing both a captive and a free spear in positions to be fired after the gun has been cocked.
Figure 2:
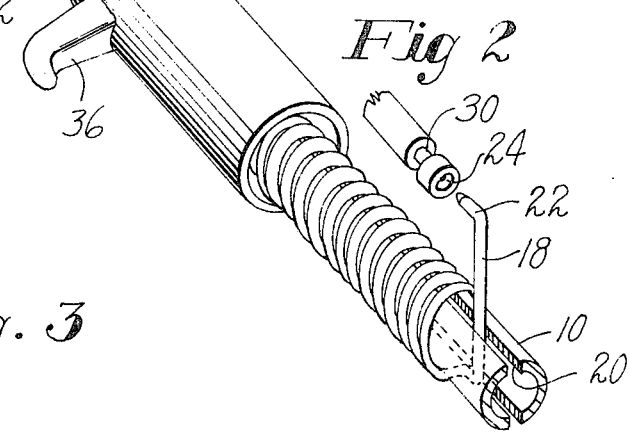
FIG. 2 is a fragmentary detail view in perspective showing a spear propelling spring and parts associated with the spring which are included in the construction of the gun depicted in FIG. 1.
Figure 3:
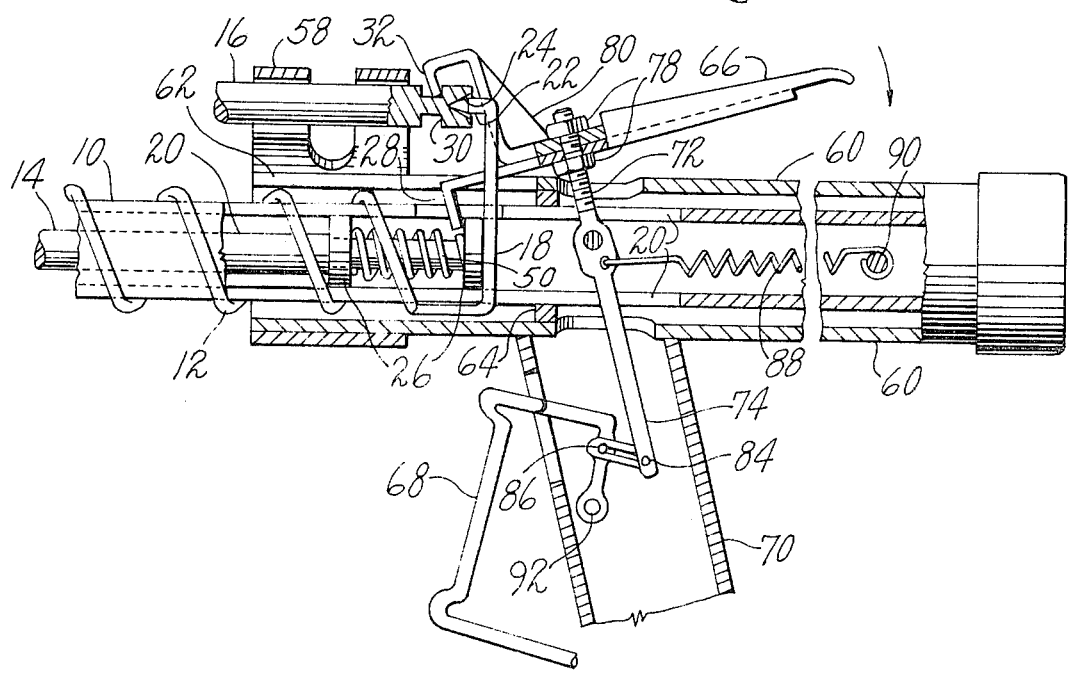
FIG. 3 is a fragmentary detail view largely in longitudinal section depicting a trigger mechanism forming a part of the spear gun of FIG. 1.

Turning now to the drawings, particularly FIGS. 1 to 3 inclusive, there is depicted a spear fishing gun comprising a barrel 10 around which is wrapped a propelling spring for forcefully projecting either a captive spear 14 or a free spear 16. The spring 12 is formed at its rearward end with a tail 18 passing through a slot 20 cut in the walls of the tube thus being placed in engagement with the rearward end of the spear 14. The tail 18 is also formed with a forwardly projecting extension 22 which engages an identation 24 in the rearward end of the spear 16.

The slot 20 extends a sufficient distance forwardly as shown in FIG. 5 to permit the spring 12 to contract fully from an extended condition in the process of firing either of the spears. Before extending the spring 12, either the spear 14 is returned to its rearward position or a free spear 16 is placed in firing position. In the rearward position of the captive spear 14, one of a pair of washers 26 is captured by a sear or keeper 28 forming a part of the trigger mechanism to be described later. Alternatively, if a free spear is to be fired, a spear 16 is loaded into its firing position in which it is retained by the entry into a groove 30 of another sear or keeper 32 also forming a part of the trigger mechanism. After either the captive spear 14 or a free spear 16 has been placed in firing position, that is, retained by its keeper, the spring 12 is extended preparatory to firing. For this purpose, the forward end of the spring 12 is secured inside a generally tubular slider 34 loosely fitting the exterior of the barrel 10 as best seen in FIG. 4. The slider 34 is formed with a laterally extending abutment 36 for greater handling ease and at its forward end with a plurality of interconnected bayonnet slots 38, 40 and 42 any one of which may be hooked upon a pin 44 fixedly secured to the exterior of the barrel. Thus, when the slot 38 engages the pin 44, the spring 12 is extended least and fires the spear with the least propelling force whereas the extension of the spring and hence the propelling force is progressively greater if the slots 40 and 42 are engaged. The choice of the specific slot to be engaged depends upon the nature and range of the target.

The captive spear 14 is guided by loosely fitting along its length a central perforation 46 in a cap 48 fixedly secured to the forward end of the barrel 10 as best seen in FIG. 2. At its rearward end, the spear 14 is fitted with the two spaced apart washers 26, the rearward one of which is riveted or otherwise permanently secured to the shaft of the spear and the forward one of which is separated from the rearward one by a compression spring 50. This spring arrangement acts as a shock absorber when the spear 14 is projected to the forward end of its travel and the forward washer 26 forcefully contacts the interior of the cap 48.

The free spear 16 is prepared for firing by being inserted into a tube 54 fixedly mounted in parallel relationship with the front end of the barrel 10 on a pair of spacer blocks 56. The rearward end of the spear 16 is positioned by a ferrule 58 surrounding and fixedly secured upon a tubular grip 60 which is mounted around the rearward end of the barrel 10, is slotted at 62 at its forward end for passage of the spring tail 18 and is centralized around the barrel by a ring 64. The forward end of the barrel 10 is additionally formed with a plurality of perforations 65 to permit the escape of water which would otherwise be compressed in the barrel between the cap 48 and the forward washer 26, and would thus slow down the captive spear 14. Thus the spear 16 when readied for firing has its rearward end resting in the cradle formed by the ferrule 58 and the forward extension 22 of the spring tail 18 enters the indentation 24 while the keeper 30 is in engagement with the groove 22 to retain the spear in its rearward position before the spring 12 is stretched or cocked.

The trigger mechanism is best seen in FIGS. 1, 3 and 5 and comprises a pair of interconnected triggers 66 and 68 employed for firing either the spear 14 or the spear 16 when the gun assembly is held respectively by the tubular grip 60 or by a pistol grip 70 depending from the tubular grip. The two triggers are interconnected by a lever comprising upper and lower arms 72 and 74 and pivoted inside near the rearward end of the barrel 10 on integral trunnions 76. The sear 28 forms the forward end of the trigger 66 which is adjustably mounted between a pair of check nuts 78 upon the arm 72 which for this purpose is threaded at its upper end. Also secured to the trigger 66 and the upper arm 72 of the lever is a vertically extending bracket 80 of which the sear 32 forms an integral part. The lower arm 74 is connected to the trigger 68 by a link 82 pivoted at 84 and 86 to the arm and trigger 68 respectively. A spring 88 is stretched between the lever 72, 74 and an anchor pin 90 in the barrel to urge the lever and the sears 28 and 32 in a counter-clockwise direction. The action of the spring 88 thus urges the sear into engagement with the related spear 14 or 16 when the spear is in firing position and additionally lifts the thumb-engageable end of the trigger 66. The trigger 68, which is pivoted on the grip 70 at 92, is offset to pass through a slot in the grip and is also urged by the spring 88 in a clockwise direction and away from the grip 70.

Having thus disclosed my invention, what I claim as new and desire to secure by Letters Patent of the United States is:

1. A spear fishing gun assembly comprising a barrel having forward and rearward ends, a spear slidably supported in the barrel and having a rearward end near the rearward end of the barrel, means on the forward end of the barrel for retaining the spear captive in the barrel, means for propelling the spear including a spring wrapped around the barrel and having a rearward end in engagement with the rearward end of the spear, means for holding the spring in stretched condition, a first sear means for retaining the spear in its rearward position against the force of the spring and a first trigger means for releasing the spear after the spring has been stretched.

2. A spear fishing gun assembly according to claim 1 further comprising a free spear, means on the gun for alternatively firing the free spear including a tube disposed in parallel relationship with the barrel and a second sear means connected to the trigger and to the first sear means for retaining the free spear in the tube against the force of the spring.

3. A spear fishing assembly according to claim 2 comprising a grip generally concentric with the barrel, a pistol grip depending from the grip and a second trigger means for gripping by a hand of a user while holding the assembly by the pistol grip, said second trigger means being connected to both sear means.

4. A spear fishing assembly according to claim 2 comprising means integral with the spring for engaging either the captive or the free spear and further characterized in that the means for holding the spring in stretched condition includes means for varying the degree of elongation of the spring.

5. A spear fishing gun assembly according to claim 1 further comprising a grip mounted generally concentric with the barrel and adjacent the first trigger means.

6. A spear fishing assembly according to claim 5 further comprising a pistol grip depending from the grip and a second trigger means for gripping a hand of a user while holding the assembly by the pistol grip.

* * * * *